United States Patent [19]

Wengelski et al.

[11] Patent Number: 5,159,678
[45] Date of Patent: Oct. 27, 1992

[54] METHOD FOR EFFICIENT NON-VIRTUAL MAIN MEMORY MANAGEMENT

[75] Inventors: Diane M. Wengelski; Gregory G. Gaertner, both of Eau Claire, Wis.

[73] Assignee: Supercomputer Systems Limited Partnership, Eau Claire, Wis.

[21] Appl. No.: 572,045

[22] Filed: Aug. 23, 1990

Related U.S. Application Data

[63] Continuation-in-part of Ser. No. 537,466, Jun. 11, 1990.

[51] Int. Cl.$^5$ .................. G06F 12/02; G06F 13/00
[52] U.S. Cl. .................. 395/425; 395/650; 364/DIG. 1; 364/246; 364/246.11

[56] References Cited

U.S. PATENT DOCUMENTS

| | | | |
|---|---|---|---|
| 4,229,789 | 10/1980 | Morgan et al. | 364/200 |
| 4,420,807 | 12/1983 | Nolta et al. | 364/200 |
| 4,442,488 | 4/1984 | Hall | 364/200 |
| 4,481,573 | 11/1984 | Fukunaga et al. | 364/200 |
| 4,571,674 | 2/1986 | Hartung | 364/200 |
| 4,577,274 | 3/1986 | Ho et al. | 364/200 |
| 4,607,331 | 8/1986 | Goodrich, Jr. et al. | 364/200 |
| 4,685,057 | 8/1987 | Lemone et al. | |
| 4,758,951 | 7/1988 | Sznyter, III | 364/200 |
| 4,785,395 | 11/1988 | Keeley | 364/200 |
| 4,967,353 | 10/1990 | Brenner et al. | 364/200 |

OTHER PUBLICATIONS

IBM Tech. Disclosure Bulletin vol. 28 No. 4 Sep. 1985 T. Sawyer Dynamic Storage Pool Manager pp. 1684–1686.
IBM Tech. Disclosure Bulletin vol. 18 No. 7 Dec. 1975 T. Sawyer Main Storage Allocation Method.
The Unix Operating System by Kaare Christian, pp. 238, 239 and 314.
Principles of Operating Systems, Sacha Krakowiak, pp. 339 and 340.
*The Design of the Unix Operating System*, Bach, Maurice J.; pp. 271–285. ©1986 Bell Telephone Laboratories; Inc.

Primary Examiner—Alyssa H. Bowler
Attorney, Agent, or Firm—Patterson & Keough

[57] ABSTRACT

The present invention provides a parallel memory scheduler for execution on a high speed highly parallel multiprocessor architecture. The operating system software provides intelligence and efficiency in swapping out process images to facilitate swapping in another process. The splitting and coalescing of data segments are used to fit segments in to current free memory even though a single contiguous space of sufficient size does not exist. Mapping these splits through data control register sets retains the user's contiguous view of the address space. The existence of dual images and partial swapping allows efficient, high speed swapping. Candidates for swap out are chosen in an intelligent fashion, selecting only those candidates which will most efficiently aLlow the swapin of another process.

40 Claims, 14 Drawing Sheets

Fig. 4

| | |
|---|---|
| S_LB | LOGICAL LOWER BOUND (LOGICAL STARTING ADDRESS) |
| S_UB | LOGICAL UPPER BOUND (LOGICAL ENDING ADDRESS) |
| S_BASE | PHYSICAL ADDRESS |
| S_SIZE | SEGMENT SIZE IN CLICKS |
| S_SWAPADDR | SWAP DEVICE ADDRESS |
| S_PSI | POINTER TO SHARED IMAGE ENTRY |
| S_FLOC | SLOC FORWARD LINK |
| S_BLOC | SLOC BACKWARD LINK |
| S_FSZ | SAVAIL OR SACTIVE FORWARD LINK |
| S_BSZ | SAVAIL OR SACTIVE BACKWARD LINK |
| S_SLIST | LIST OF SWAPPED SEGMENTS |
| S_NXTSPLT | NEXT SPLIT IN THIS SEGMENT |
| S_PRVSPLT | PREVIOUS SPLIT IN THIS SEGMENT |
| S_FLAGS | FLAGS INDICATING SG_SPLIT, SG_JUST_IN, OR SG_LOAD |

90 — RELEVENT FIELDS IN A SEGMENT TABLE ENTRY

Fig. 6

| Field | Description |
|---|---|
| SI_DATA_AVAIL | REMAINING AVAILABLE DATA CONTROL REGISTER SETS FOR THIS SHARED IMAGE (REMAINING SPLITS AVAILABLE) |
| SI_TEXT_AVAIL | REMAINING AVAILABLE TEXT CONTROL REGISTER SETS FOR THIS SHARED IMAGE |
| SI_SEGS_IN | NUMBER OF ALLOCATED SEGMENTS FOR THIS SHARED IMAGE |
| SI_NPROC | NUMBER OF PROCESSES SHARING THIS IMAGE |
| SI_NSLEEP | NUMBER OF SLEEPING PROCESSES WHICH ARE SHARING THIS IMAGE |
| SI_SONPROC | NUMBER OF RUNNING PROCESSES WHICH ARE SHARING THIS IMAGE |
| SI_SRUN | NUMBER OF PROCESSES ON THE RUN QUEUE WHICH ARE SHARING THIS IMAGE |
| SI_MICROTASKS | NUMBER OF MICROTASKS IN THIS SHARED IMAGE |
| SI_CAND_CNT | NUMBER OF SEGMENTS WHICH ARE SWAPOUT CANDIDATES NOW |
| SI_SHTX_LINK | LINK TO OTHER IMAGES SHARING THE SAME TEXT SEGMENT |
| SI_SHLIB_LINK | LINK TO OTHER IMAGES SHARING THE SAME SHARED LIBRARY TEXT SEGMENT |
| SI_SHMM_LINK | LINK TO OTHER IMAGES SHARING THE SAME SHARED MEMORY SEGMENT |

RELEVENT FIELDS IN A SHARED IMAGE PROCESS TABLE ENTRY /190

DUAL IMAGE CONCEPT

METHOD FOR EFFICIENT NON-VIRTUAL MAIN MEMORY MANAGEMENT

RELATED APPLICATIONS

This application is a continuation-in-part of an application filed in the U.S. Pat. and Trademark Office on Jun. 11, 1990, entitled INTEGRATED SOFTWARE ARCHITECTURE FOR A HIGHLY PARALLEL MULTIPROCESSOR SYSTEM, Ser. No. 07/537,466 and assigned to the assignee of the present invention, the disclosure of which is hereby incorporated by reference in the present application. The application is also related to co-pending application filed concurrently herewith, entitled DUAL LEVEL SCHEDULING OF PROCESSES TO MULTIPLE PARALLEL REGIONS OF A MULTITHREADED PROGRAM ON A TIGHTLY COUPLED MULTIPROCESSOR COMPUTER SYSTEM, Ser. No. 07/571,995 and to pending application, entitled GLOBAL REGISTERS FOR A MULTIPROCESSOR SYSTEM, Ser. No. 07/536,198, both of which are assigned to the assignee of the present invention, the disclosure of which is hereby incorporated by reference in the present application.

TECHNICAL FIELD

The invention relates in general to operating system software for computer processing systems. More particularly, the present invention relates to methods for managing main memory for a non-virtual memory computer system.

BACKGROUND ART

Present day computer systems normally have an operating system; usually software interfacing with hardware, which functions to perform operations essential to the successful running of the computer system. The operating system for computer systems of the type incorporating the present invention have a storage management system which consists of complex software and hardware mechanisms. Computer systems of this type can perform multiprogramming and can include multiple tightly coupled parallel processors sharing a common main storage or memory. Because of this, the storage management system, for the successful operation of the computer system, must ensure that the common main storage is available for use without undue delay by the multiple programs and processors. One technique used by the storage management system to accomplish this is process or program swapping. When more programs or processes are in various states of execution than can be stored in main storage, the storage management system transfers one or more processes to a secondary storage device, called a swap device, such as disk storage or other type of mass storage, i.e. swapping out, and an executable process can be transferred from the swap device into main storage by the storage management system, i.e. swapping in.

Also, some operating systems have a storage management system which can do demand paging to facilitate multiprogramming. In such computer systems, the entire process or program does not have to reside in main storage to execute. The storage management system loads pages of a process on demand at the time the process references the required pages.

The present invention is incorporated in a computer system that does not have demand paging. The entire process to be executed must reside in main storage and remain therein until it becomes ineligible to execute. Therefore, while the storage management system of some computer systems can not perform demand paging to facilitate multiprogramming or the use of highly parallel multiprocessors sharing a common main storage, they can use process swapping. Some computer systems using swapping, such as Unix TM [1] System V, select swapout candidates according to their priority and residence time in main storage. The entire process image of the selected candidate is swapped out. In some instances the amount of free main storage space required for the process to be swapped in causes the swapping out of more than one process; however, using the same selection parameters. This results in greater swapping overhead and a less efficient and slower storage management system than the present invention because the present invention involves location and size when selecting swapout candidates.

[1]. Unix is a trademark of AT&T Bell Laboratories

In the present invention in addition to a list of available memory segments, separate lists of allocated and of free memory spaces are provided. The available and allocated circular lists are disjoint lists of segments which together account for all of memory. These lists are ordered by size. A third circular list orders all of the segments, both allocated and available, by their location in memory. This enhances efficiency because segment size and location can now also be used as parameters when selecting swapout candidates.

Additionally, past storage management systems, such as the storage management system of UNIX System V did not have a data structure which embraced capabilities of the present invention such as segment splitting. The present invention improves the efficiency and speed of the storage management system by providing the segment splitting capability. Without the segment splitting capability, prior storage management systems had to swap out enough contiguous segments from main storage which would make room for the total size of the segment to be swapped in.

The shared image data structure of the present invention enables main storage management to perform its function for microprocessing which was also lacking in prior storage management systems.

The present invention is an improvement over such past storage management systems in that it selects the least number of the most inefficient processes as candidates for swapout. Additionally, the present invention provides for the swapping of a subset of the total process image, i.e. partial swapping. Partial swapping allows the mixing of pieces of very large processes in main storage with smaller processes. This is accomplished without causing undue system overhead such as in the past when large processes were completely swapped out. These improvements provide a more efficient and faster main memory management system.

SUMMARY OF THE INVENTION

The principal objective of the present invention is to provide an improved main memory management system for computer systems and more particularly for non-virtual computer systems which support multiprogramming and can include multiple tightly coupled processors sharing a common main storage, and still more particularly to provide an improved main storage management system for such computer systems which is more efficient and faster.

These objects are achieved by incorporating process swapping into the main storage management system where the swapout candidates are selected according to the least number of the most inefficient processes and where a subset of a total process image can be selected for swapout.

New data structures are provided so that the main memory management system can perform improved swapping. These new data structures in the present invention take the form of lists and tables. One table, the segment table, is made up of segment entries which contain fields and flags which indicate logical boundaries, physical addresses, segment splits, and fields indicating if a segment is resident in memory, on a swap device, or both. One circular list, savail, orders available memory segments by size. One circular list, sactive, orders allocated memory segments by size. One circular list, sloc, orders both available and allocated memory segments by location. The savail, sactive, and sloc lists are threads through the segment table entries. One table, the shared image process table, contains fields and flags which indicate the status of process images.

In the preferred embodiment, i.e. non-virtual computer systems which support multiprogramming and can include multiple tightly coupled processors sharing a common main storage, each processor at a minimum has one set and preferably more, of data control registers which are used by the memory management system to map segment splits thereby enabling a user process to view a split segment as being contiguous, i.e. unsplit. By doing segment splitting and segment coalescing, available memory space can be used without reconfiguring memory, i.e. using main memory as it is currently allocated. When split segments are swapped out of main memory, they are re-united or coalesced on the swap device to allow the segment to be split into unique fragments to again fit the current memory configuration at the time of the next swapin.

Also, tables contain a flag used to facilitate partial swapping. This flag indicates if a segment of a process is in main memory or has been swapped out. By this arrangement, if a process to be swapped in can fit in a segment of a process which is a candidate to be swapped out, then it is only necessary to swap out the segment rather than the entire process which has been done in the past. Partial swapping can also accommodate a segment which needs additional memory space in order to grow beyond adjacent free space. Partial swapping to allow growth may be more efficient than the past method of memory to memory segment copy depending on the difference between memory-to-memory and memory-to-swap-device transfer rates of the hardware the memory management system is being used on.

When a process has some segments in main memory and some of its segments are on the swap device, the segments already in main memory are dual image segments. Therefore, when that process is being swapped in, only the segments which are not already in main memory are swapped in rather than the entire process image. Dual images of a process's segments are kept as long as possible so as to reduce the amount of memory allocation and physical I/O required to move an entire process image into main memory.

Although in the present invention main memory management is implemented in a computer system of the type described in the above referenced patent applications, it is not limited to this implementation. The method of the present invention can be implemented in other functions and utilities that require a main memory management scheme for a non-virtual or high speed, highly parallel, multiprocessor computer system.

These and other objectives of the present invention will become apparent with reference to the drawings, the detailed descriptions of the preferred embodiment and the appended claims.

DESCRIPTION OF THE TERMS

Coalescing of memory is the process by which fragmented data segments are merged into one contiguous space when they are swapped out.

Data control register sets are hardware registers used to map fragmented data segments so that the user sees one contiguous segment.

Dual images are processes which have both reserved main memory and a swap image at the same time.

Fork is a standard UNIX system call invoked by a parent process in order to create a new child process.

Microprocesses (mprocs) are a type of lightweight process that have a very low context switch overhead, are discardable upon exit, are reusable prior to disposal, provide a means for dividing up work to be done into very small segments, and return only the result of the work with no other context information.

Partial swapping allows a portion of a large process to be swapped out for another process that is to be swapped in or in order to grow beyond adjacent free memory.

Process image is the representation of the process resources within the operating system, such as context information, executable code, and data for a process.

Process table contains control and status information needed by the kernel about each process in the system.

Sactive is a dummy segment structure which heads a circular doubly linked list of allocated segment entries ordered by size.

Savail is a dummy segment structure which heads a circular doubly linked list of available segment entries ordered by size.

Segment table is made up of segment entries which describe attributes of sections of memory which they govern, such as whether they contain text or data, whether they are shared or private, whether they are split or unsplit, and where the data of each segment is located in memory and/or on a swap device.

Segments are contiguous parts of a process image which are required to be in main memory during the process's execution.

Shared image is a single process image possibly shared by multiple microprocesses executing multiple threads of a multithreaded program.

Shared image process table is made up of entries which contain information about a process image and about segments belonging to that image. If the image is not shared, it is a single process's image. If microprocesses are sharing the image, this entry contains information related to those microprocesses.

Shared memory is a type of data segment which can be split, written to, and shared by more than one process, allowing direct communication between the sharing processes.

Sloc is a dummy segment structure which heads a circular doubly linked list of allocated and available segment entries ordered by location.

Split is a fragment of a segment which resides in main memory and is described by a segment table entry.

Swap device is an area in an alternate memory used to temporarily hold a process image not currently running in order to free main memory for a process about to run. The swap device is commonly a block device in a configurable section of a disk.

Swapping is the act of allocating segments and moving the data in the segments between main memory and a swap device.

DESCRIPTION OF THE DRAWINGS

FIG. 4 is a block diagram of relevant fields in the segment table.

FIG. 6 is a block diagram of relevant fields in the shared image process table.

DESCRIPTION OF THE APPENDICES

Appendix A contains the Memory Management Pseudo-code for the preferred embodiment of the present invention.

DESCRIPTION OF THE PREFERRED EMBODIMENT

MEMORY MANAGEMENT

Figure 1:
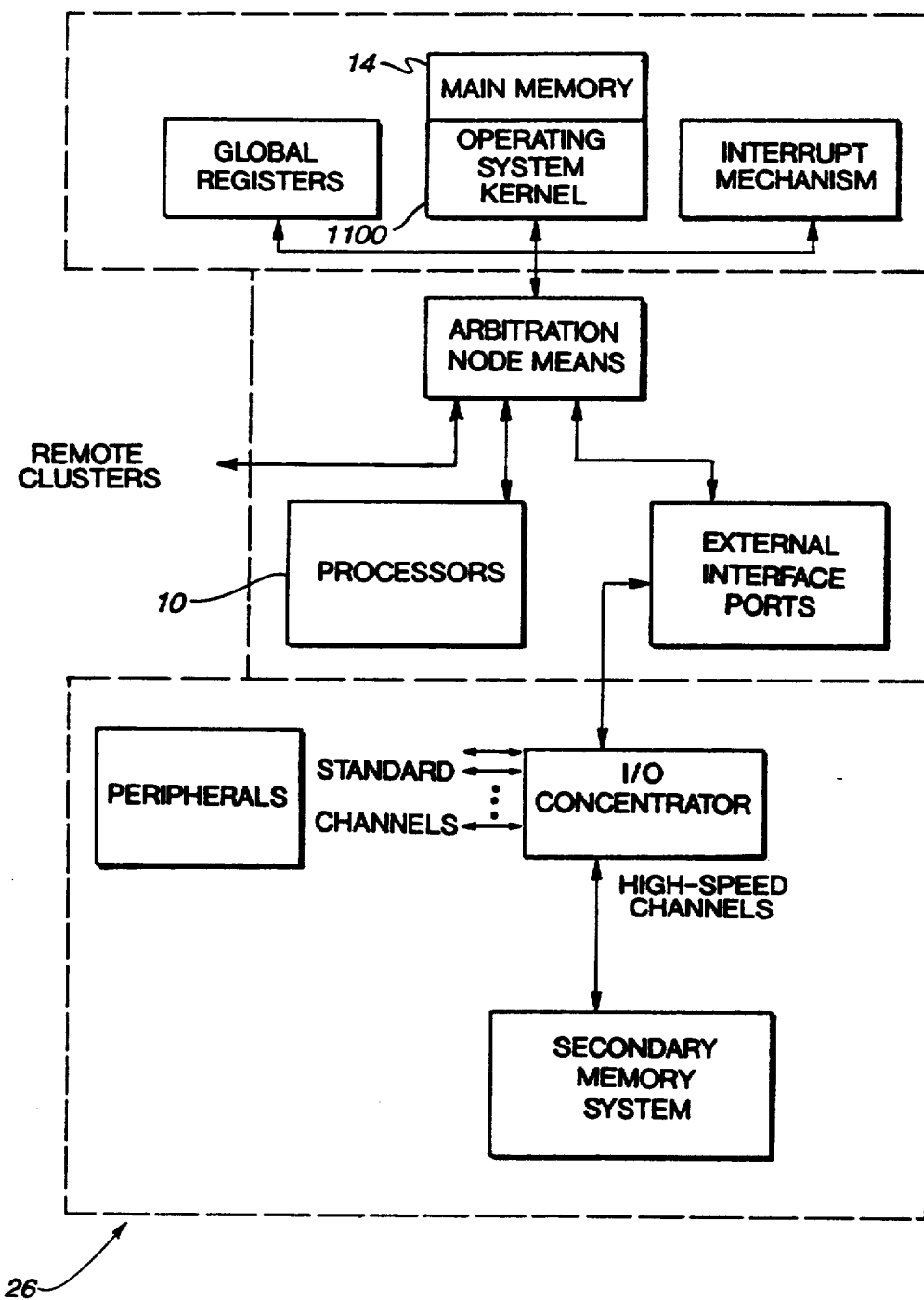
FIG. 1 is a schematic block diagram of a single multiprocessor cluster system incorporating the present invention.

With reference to the drawings and particularly to FIG. 1, the present invention by way of example is illustrated as being incorporated in a single multiprocessor cluster system having an operating system kernel 1100 resident in main memory 14. FIG. 1 is substantially the same as FIG. 5 of the referenced commonly assigned co-pending patent application entitled Integrated Software Architecture for a Highly Parallel Multiprocessor System, Ser. No. 07/537,466, filed on Jun. 11, 1990.

Figure 2:
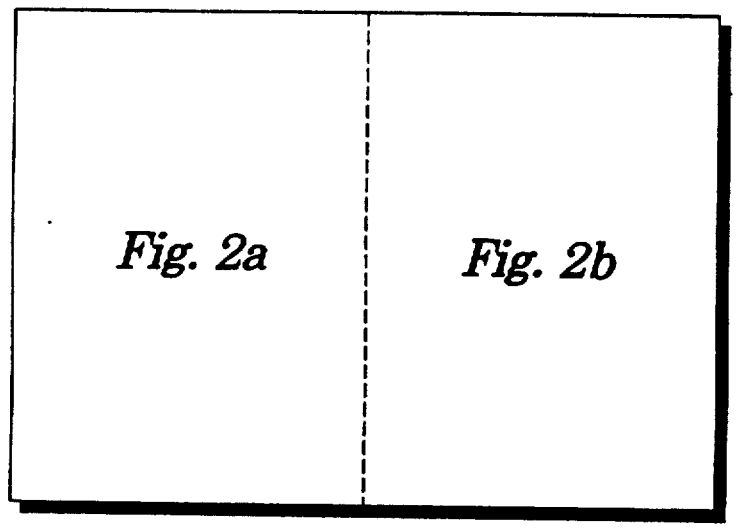
FIG. 2 comprised of 2(a) and 2(b) are diagrams illustrating the sofware architecture for the multiprocessor system of FIG. 1.
Figure 2A:
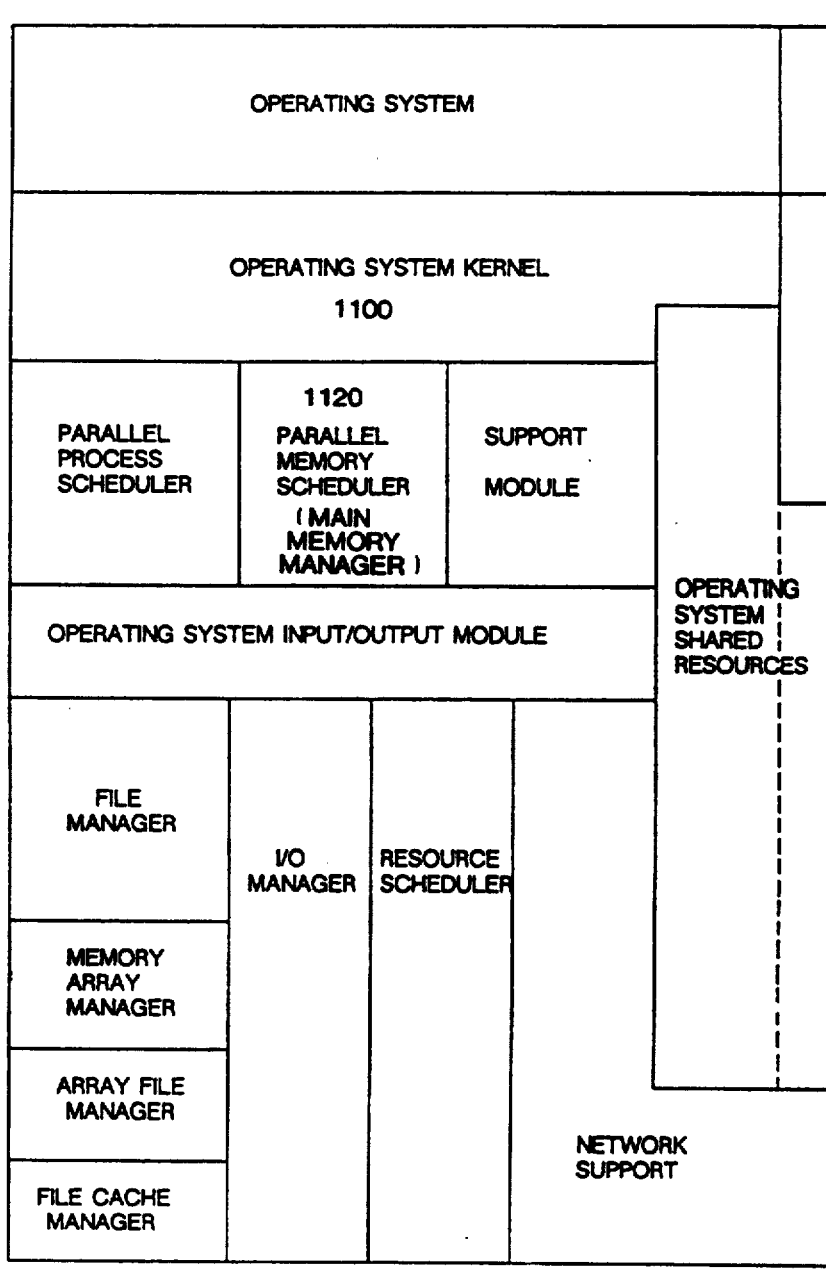
Figure 2B:
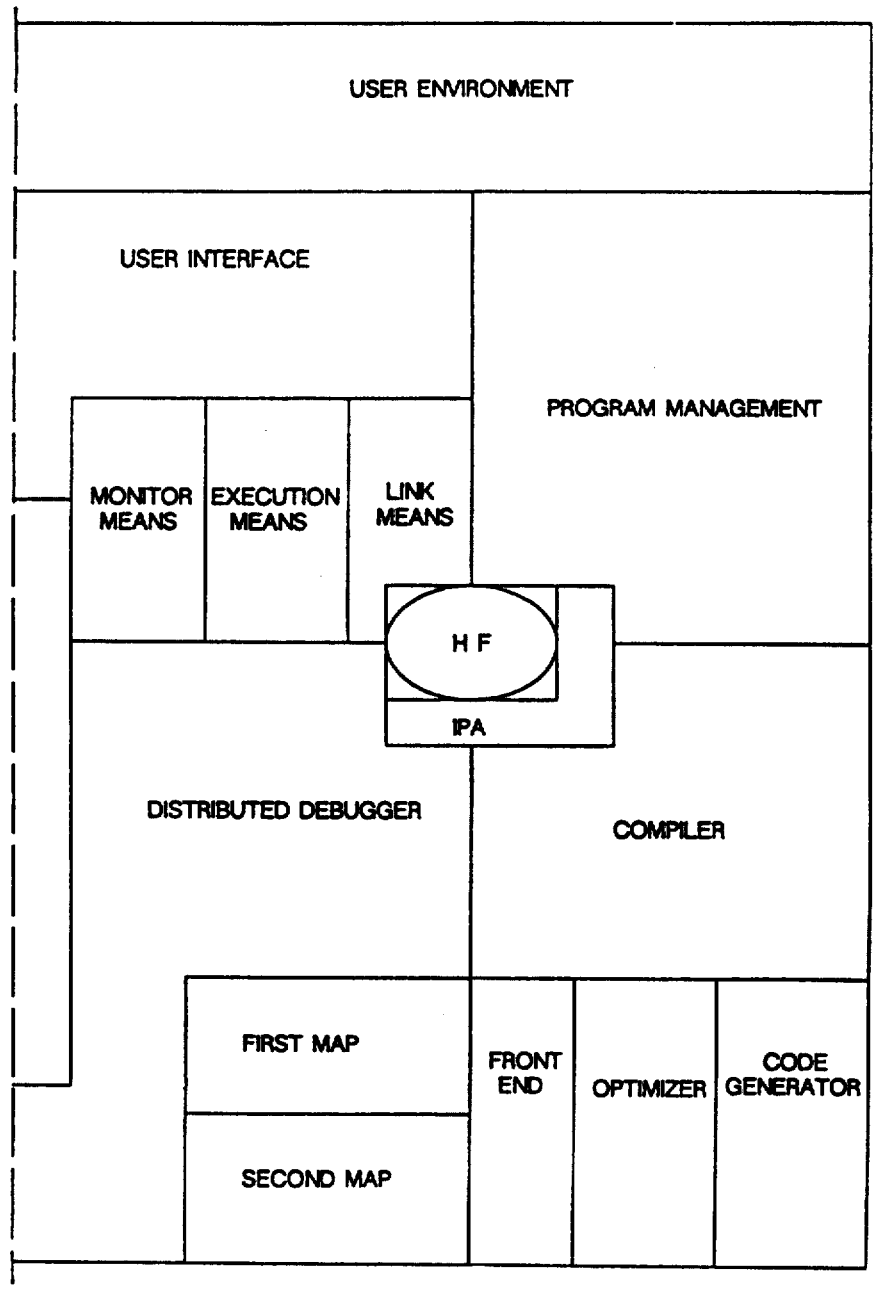
Figure 3:
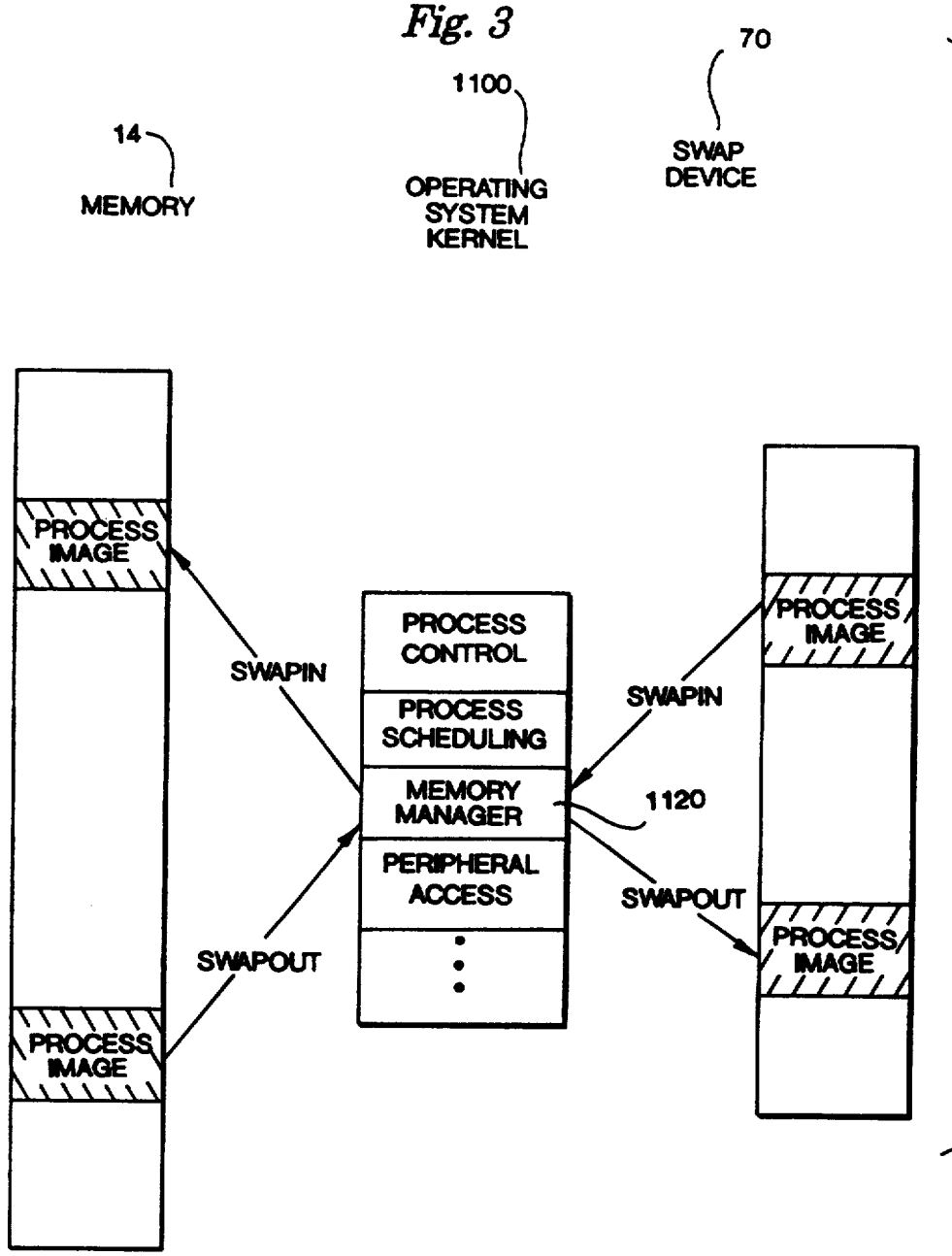
FIG. 3 is a block diagram illustrating the swapin and swapout functions.

FIG. 2 illustrates the operating system kernel 1100 which includes a memory scheduler or main memory management system 1120. FIG. 2 is substantially the same as FIG. 8 of the aforementioned referenced patent application. The main memory management system 1120 functions to allocate storage space in main memory 14 for processes to be run and de-allocate storage space in main memory 14 from those processes which have run and are in a wait state. Main memory 14 has a finite amount of storage space and normally there are more processes in the system than can be stored in main memory 14. Memory management 1120 is responsible for finding or making main memory 14 space available to the process which is to be currently run by the computer system. A process image is a representation of the process resources within the operating system, such as code, data, stack, context information, and registers. This process image is separated into a multiple number of segments of type text, data, shared memory, library text, library data, or user. If space for this process image is unavailable in main memory 14, the memory manager 1120, FIG. 3, can swapout an entire process image, multiple process images, or a subset of the segments within a process image and place it on a mass storage device such as an alternate memory, a disk storage system, or other suitable storage device which is termed a swap device such as swap device 70. The process image to be run is residing on swap device 70 and it is swapped into main memory 14. That process will then be executed by a processor 10 either running to completion or going into a wait state due to some condition such as waiting for an input/output, I/O, device. While in this wait state the process becomes a candidate for swapout.

The memory manager 1120 in the preferred embodiment of the invention uses the segment table 90, of which a partial entry is shown in FIG. 4, to keep track of segments belonging to processes in the system. Fields which are discussed herein and which are most relevant to the functioning of the memory manager are included in the diagram. A segment table 90 entry is created and maintained by the memory manager 1120 for each segment and each segment split belonging to a process which is in the system.

Figure 5:
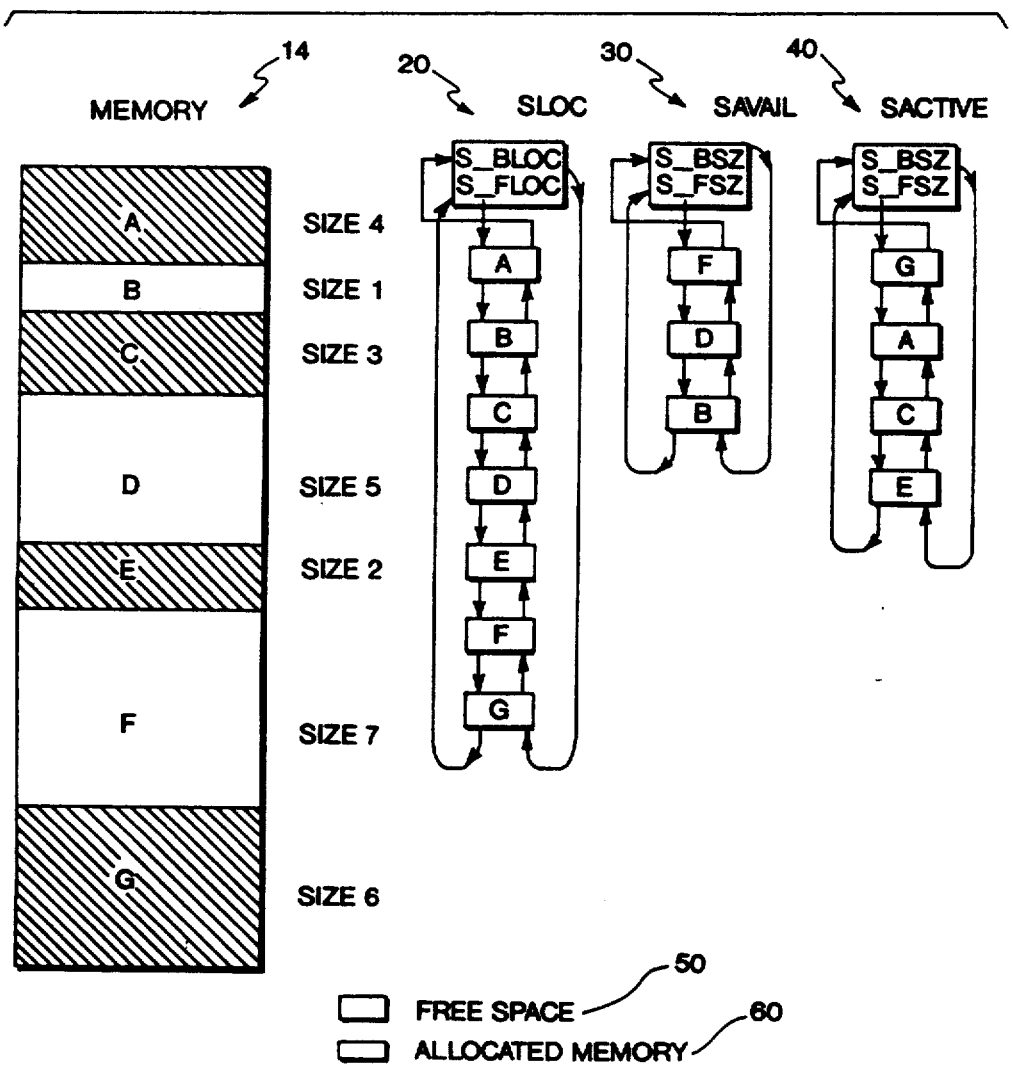
FIG. 5 is a diagram illustrating memory layout lists.

The memory manager 1120 in the preferred embodiment of the invention uses the three circular doubly linked lists in FIG. 5 to keep track of space in main memory 14. The sloc 20 list orders all main memory 14 segments, whether free 50 or allocated 60, by location. Sloc 20 uses pointers kept in each segment table 90 entry (s_floc is the forward link, s_bloc is the backward link) to link all segments. The savail 30 list orders main memory 14 segments which are free 50, or available for allocation. The sactive 40 list orders main memory 14 segments which are currently active 60, or unallocatable. Both the sactive 40 and the savail 30 lists are ordered by segment size. Both sactive 40 and savail 30 uses pointers kept in each segment table 90 entry (s_fsz is the forward link, s_bsz is the backward link) to link segments. Entries in savail 30 and sactive 40 are mutually exclusive, as are use of the segment table 90 pointers s_fsz and s_bsz. The sum of the entries in savail 30 and sactive 40 equal the entries in sloc 20. The memory manager 1120 updates these lists to reflect the current memory 14 configuration each time memory 14 is reconfigured due to processes growing or entering or exiting the system. The memory manager 1120 uses these lists for allocation and freeing of main memory 14.

The memory manager 1120 in the preferred embodiment of the invention uses the shared image process table 190, of which a partial entry is shown in FIG. 6, to keep track of which processes are using each segment, whether segment splitting is possible, and information related to swapout candidates. Fields which are discussed herein and which are most relevant to the functioning of the memory manager 1120 are included in the diagram. A shared image process table 190 entry exists for every process image in the system. Although the memory manager 1120 maintains a number of fields in the shared image process table 190, the remaining fields are maintained and utilized by other parts of the operating system kernel 1100.

Figure 7:
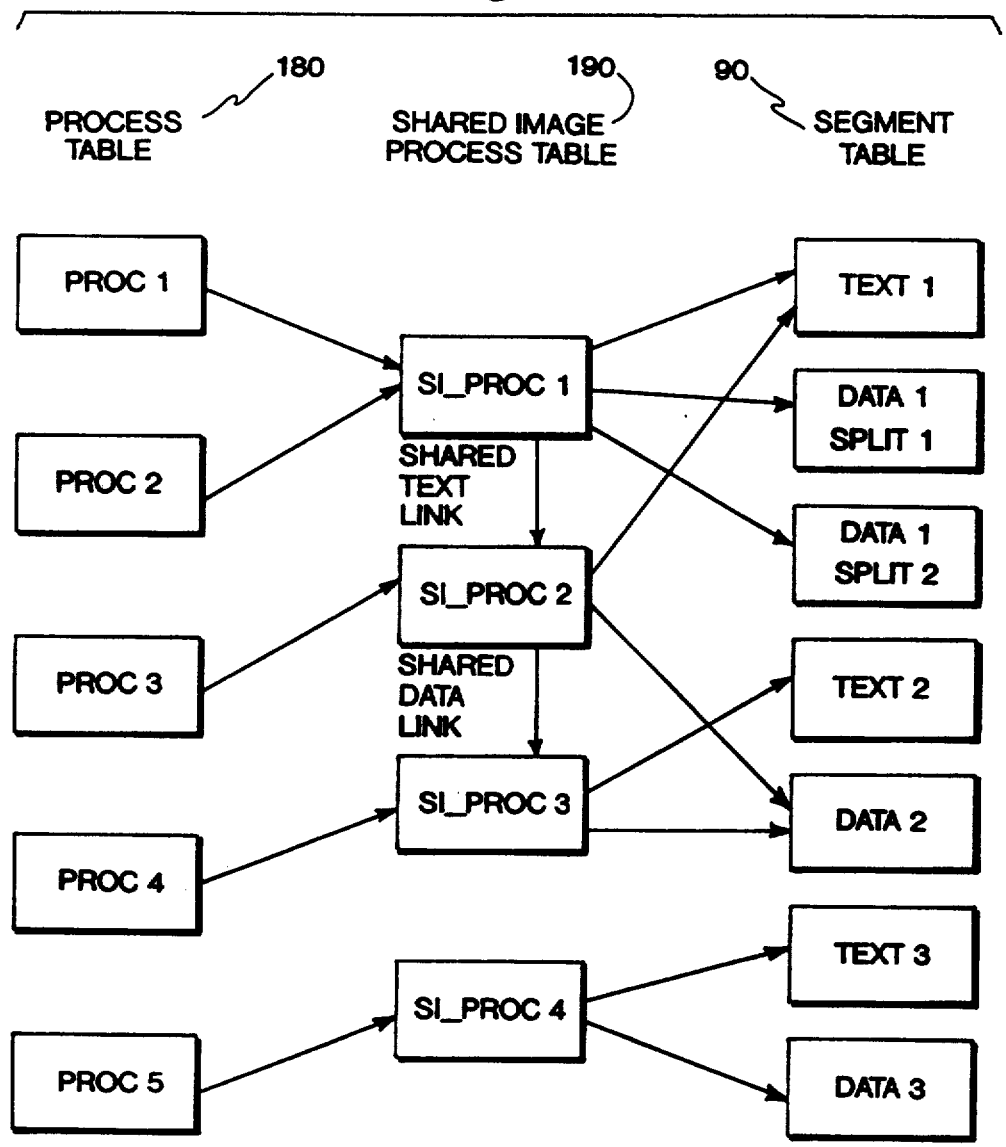
FIG. 7 is a diagram illustrating the relationship between process table entries, shared image process table entries, shared memory segments, and split segments.

The relationship between the process table 180 entries, shared image process table 190 entries, and segment table 90 entries are shown in FIG. 7. In this example, process table 180 entries 1 and 2 are actually microprocesses sharing text 1 and the split data 1. Microprocesses are thoroughly described in the referenced commonly assigned co-pending patent application entitled Dual Level Scheduling of Processes to Multiple Parallel Regions of a Multithreaded Program on a Tightly Coupled Multiprocessor Computer System, Ser. No. 07/571,958. Process table 180 entry 3 is a process which is sharing text 1 with microprocesses 1 and 2. Their shared image process table 190 entries are linked via the shared text link (si_shtx_link) to indicate this. Process table 180 entry 3 is sharing data 2 with process table entry 4. Their shared image process table 190 entries are linked via the shared data link (si_sh-mm_link) to indicate this. Process table 180 entry 5 represents a process that is not sharing any segments in its image.

The following functional description of the memory manager 1120 relates directly to the memory management pseudo-code provided in Appendix A. The functional description references the uses of the tables and fields within the tables previously mentioned.

As in standard UNIX, as part of the operating system kernel 1100 initialization, the sched process (often referred to as swapper), is initiated to allocate main memory 14 to all processes which are ready to execute, but whose process images reside on the swap device 70 and are not yet loaded in main memory 14. When there are no process images on the swap device 70 which are ready to execute, the memory manager 1120 is put in a sleep state which suspends its execution until the operating system kernel 1100 resumes its execution both periodically and when memory allocation is needed. Sched loops through the process table 180 entries FIG. 7, searching for the most eligible process which is in the "ready to run" state, but is not loaded in main memory 14. Commonly, most eligible is defined as the oldest process which is waiting only for main memory 14, some implementations also use priority as a criteria for most eligible; alternately, most eligible can take on any definition as long as no stipulations (except for the allocation of main memory 14) prevent immediate execution. Regardless of the definition of eligibility, fields in the process table 180, such as "base level user priority" and "recent processor usage", are used to define which process is the most eligible.

In order for a process to execute, its entire process image must reside in main memory 14. Each segment belonging to a process image is described in a segment table 90 entry. Each segment table 90 entry contains an s_size: field which indicates the amount of main memory 14 required for that segment. If the required space in main memory 14 is obtained for all segments of this process image, these segments are copied from the swap device 70 to main memory 14, that is, swapped in. This mechanism is accomplished by a routine called swapin, which will be explained hereafter. If enough space in main memory 14 for all segments is not obtainable, the memory space which was obtained is freed and allocation is attempted again. This allows split segments to be coalesced, then resplit in a new way, possibly fitting in the free space 50, FIG. 5 (splitting and coalescing are described in more detail hereafter). If memory allocation is still not possible, sched will put itself in the sleep state. The clock routine will wake sched at the next major clock tick at which time sched will then retry the swapin. This delay provides a chance for main memory 14 to reconfigure before allocation is attempted again. Reconfiguration of a shared main memory 14 may occur during this delay due to the movement of processes in memory 14 which are running on other processors. If swapin still fails to allocate space in memory 14, space in main memory 14 is forcibly reconfigured before swapin is attempted again.

Forcible reconfiguration is achieved by swapping out the non-running process images residing sequentially in memory 14 until enough main memory 14 is freed for all of the eligible process image segments; that is, as a last resort, the first swappable segment on the sloc 20 list is swapped out to force a memory reconfiguration. If the swapin succeeds, the next most eligible candidate to be swapped in is selected from the process table 180 for main memory allocation. If swapin was still unsuccessful, sched is yet again put in the sleep state until the next major clock tick to allow memory 14 to reconfigure. This loop continues until all swapped runnable processes are swapped in. It should be noted that sched looping through the process table 180 occurs as in standard UNIX, but the method of acquiring space in main memory 14 is unique to the present invention.

SWAPIN

Swapin is the procedure called from sched which finds allocatable or free main memory space 50 for each segment belonging to a process image. Although the swapin concept exists in standard UNIX, the implementation thereof described here is unique to the present invention. Swapin determines main memory 14 layout by using the sloc 20, savail 30, and sactive 40 lists. For each segment in a process image, swapin begins by checking if the segment already exists in main memory 14; this is indicated by the segment table field s_flags containing a value of SG_LOAD, FIG. 4.

Figure 8:
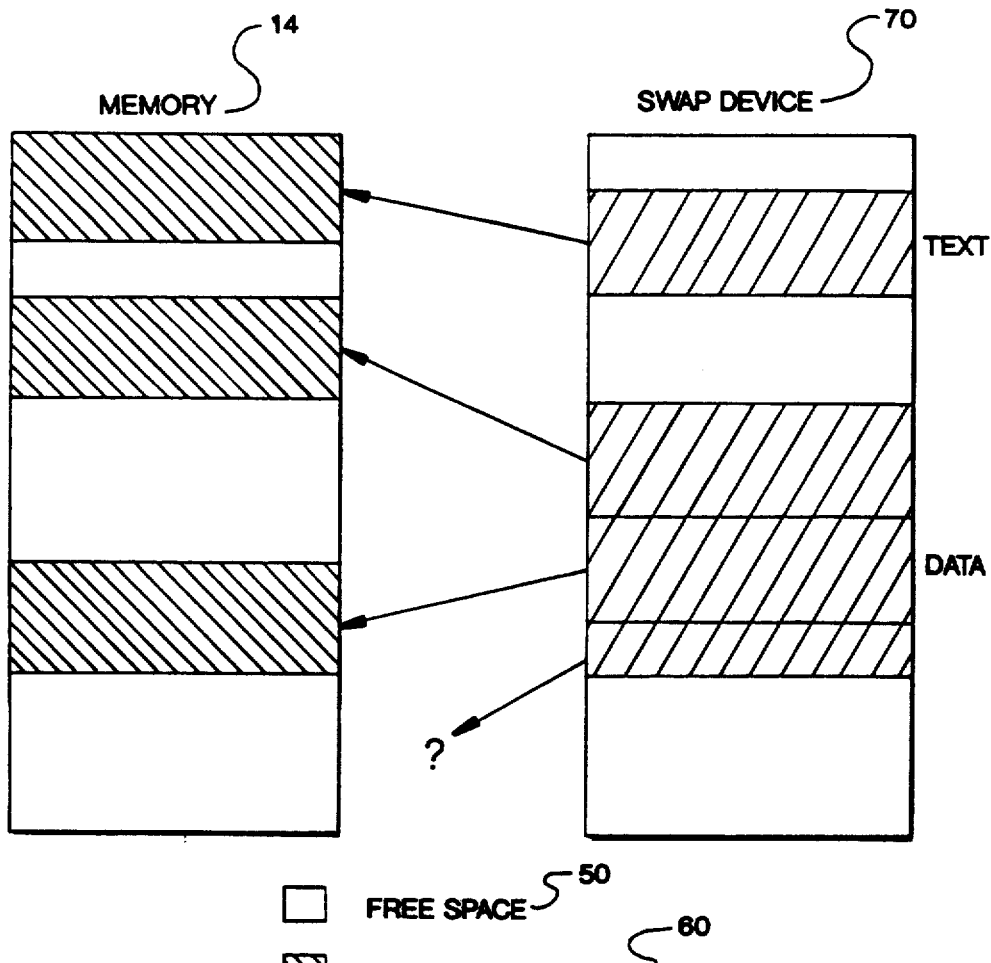
FIG. 8 is a diagram illustrating the dual image concept.

FIG. 8 shows one such situation referred to as dual images, where segments of a process image exist (are stored) in main memory 14 while also existing (being stored) on the swap device 70. Dual images result when swapin fails to acquire enough main memory 14 for all of a process image's segments. The process retains the space in memory 14 it did obtain for the process image's segments in the hope of finishing the memory allocation on the next attempt for it to be swapped in. Until this process does acquire enough main memory 14 for all of its segments, it is defined to be a process with a dual image. It is only when enough space in main memory 14 is obtained and all of a process image's segments are copied into main memory 14 from the swap device 70, that the swap image is freed. Dual images are prime candidates for swapout, since their space in memory 14 need only be freed, not copied, because the swap images have not yet been cleared from the swap device 70.

Partial swapping would also create a situation where swapin would encounter some segments of a process in main memory 14 and other segments not in memory 14. Partial swapping is the process whereby only a subset of the total number of segments of a process image have been swapped out. Partial swapping can be done to allow another process's segments to be swapped in.

Partial swapping can also be done if a single segment of a process is swapped out in order to grow. Swapping out to allow growth is a standard real memory (i.e. non-paged) method of growing a segment in memory 14 when it cannot be grown in place. That is, if space in memory 14 following this segment is already allocated (i.e. allocated memory 60, FIG. 5) and is therefore not available for this segment's growth, then the segment is swapped out, its size adjusted to include the desired growth, and it is swapped back in at its new size in a free memory space 50 that is large enough to contain it. Some memory management systems accomplish this growth by moving the segment to a larger area of free memory space 50, but in the present invention, it is more efficient to swap the segment rather than do a memory 14 to memory 14 copy, due to the particular hardware platform having a block transfer rate which is faster than the word to word memory transfer rate.

Regardless of whether the situation was created by the existence of dual images or from a partial swap, if the segment data to be swapped in already exists in main memory 14, no further allocation processing is required for it. If the segment to be swapped in does not have allocated space in main memory 14, a single memory block of sufficient size to hold the entire segment is sought by scanning the savail 30 list. If a single free space 50 in memory 14 of at least the proper size does not exist, segment splitting is considered.

Figure 9:
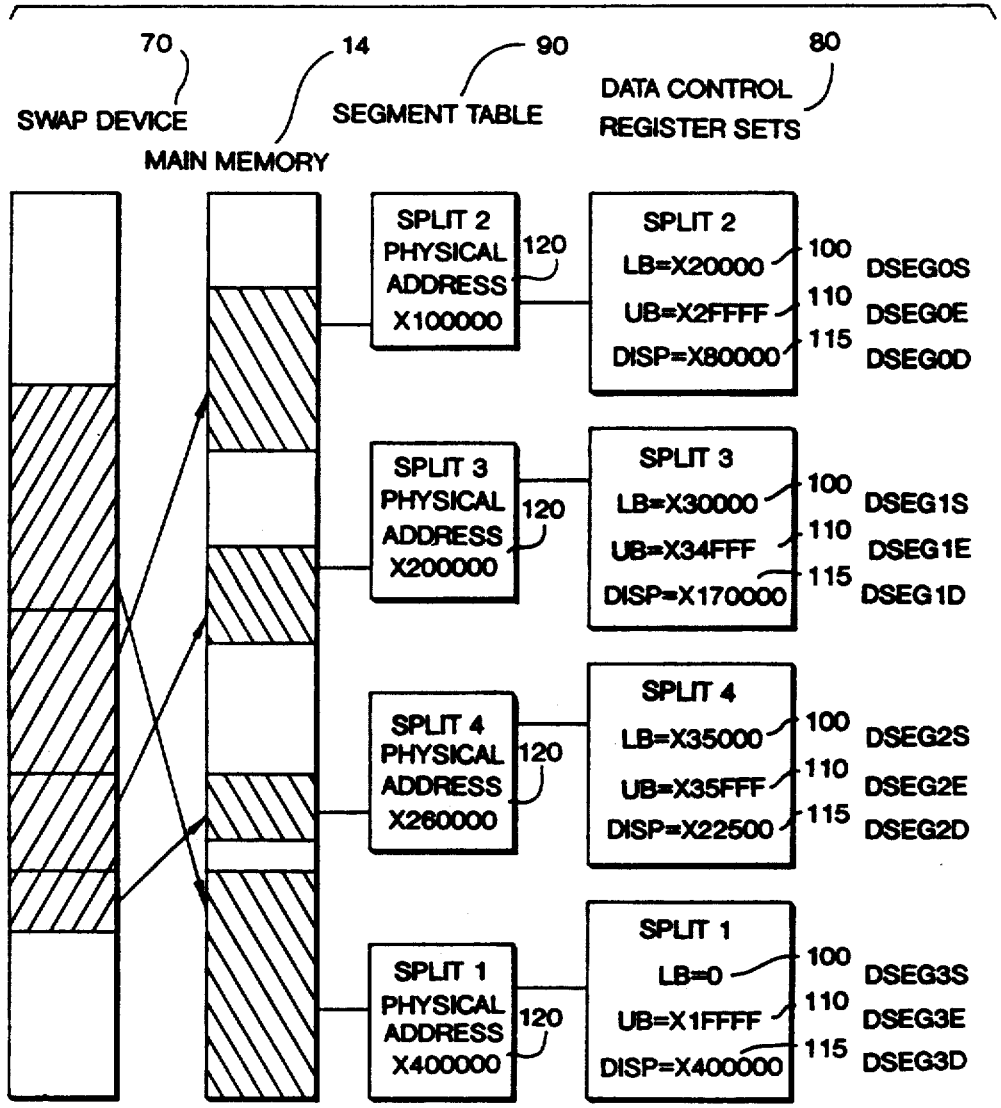
FIG. 9 is a diagram illustrating the splitting of a data segment.

Segment splitting can be accomplished if the segment to be swapped in is splittable and if the processor 10 where this process will execute has unused data control register sets 80, FIG. 9. Data control registers are thoroughly described in the referenced commonly assigned pending patent application entitled Global Registers for a Multiprocessor System, Ser. No. 07/536,198. Commonly, only data segments are defined to be splittable, but the implementation of the preferred embodiment accepts any alternate definition. The data control register sets 80 are entities of the hardware system, belonging to each processor 10. Each data control register set 80 consists of three control registers (the DSEGxS, the DSEGxE, and the DSEGxD registers, where x is between 0 and the maximum number of data segments) used to map logical to physical addresses. Each data control register set 80 records the lower bound (logical starting address) 100, the upper bound (logical ending address) 110 and the displacement 115 which must be added to the logical address to obtain the physical address 120. The lower bound 100, upper bound 110, and actual physical starting address 120, are recorded in the segment table 90 entries in fields named s_lb, s_ub, and s_base, as listed in FIG. 4. The data control register sets 80 map the splits to enable the user to interpret the fragments of the segment as a contiguous segment. The number of data control register sets 80 per processor 10 determines the maximum number of splits per process image. That is, for each split there must be a set of registers to map a user's logical address to its physical location. A field in the shared image process table 190 FIG. 6 entry (si_data_avail), keeps track of how many data control register sets 80 remain unused and can therefore be used to map splits. If it is determined that the current segment can be split, the largest piece of free memory 50 is reserved and the bounds thereof and displacement are entered in one of the data control register sets 80 to describe split. The SG_SPLIT value is entered in the segment table 90 entry s_flags field to indicate that this is a split segment. The upper bound 100, lower bound 110, and physical address 120 description are saved in the segment table 90 entry for this split (fields s_ub, s_lb, s_base). The segment table 90 entry for this split is also updated to include links to the previous and next split of this segment (fields s_prvsplt and s_nxtsplt). The shared image process table 190 entry is adjusted to hold the current count of remaining splits available (field si_data_avail). As long as unused data control register sets 80 for this processor 10 remain and the segment to be swapped in is not completely in memory 14, this splitting process continues.

Figure 10:
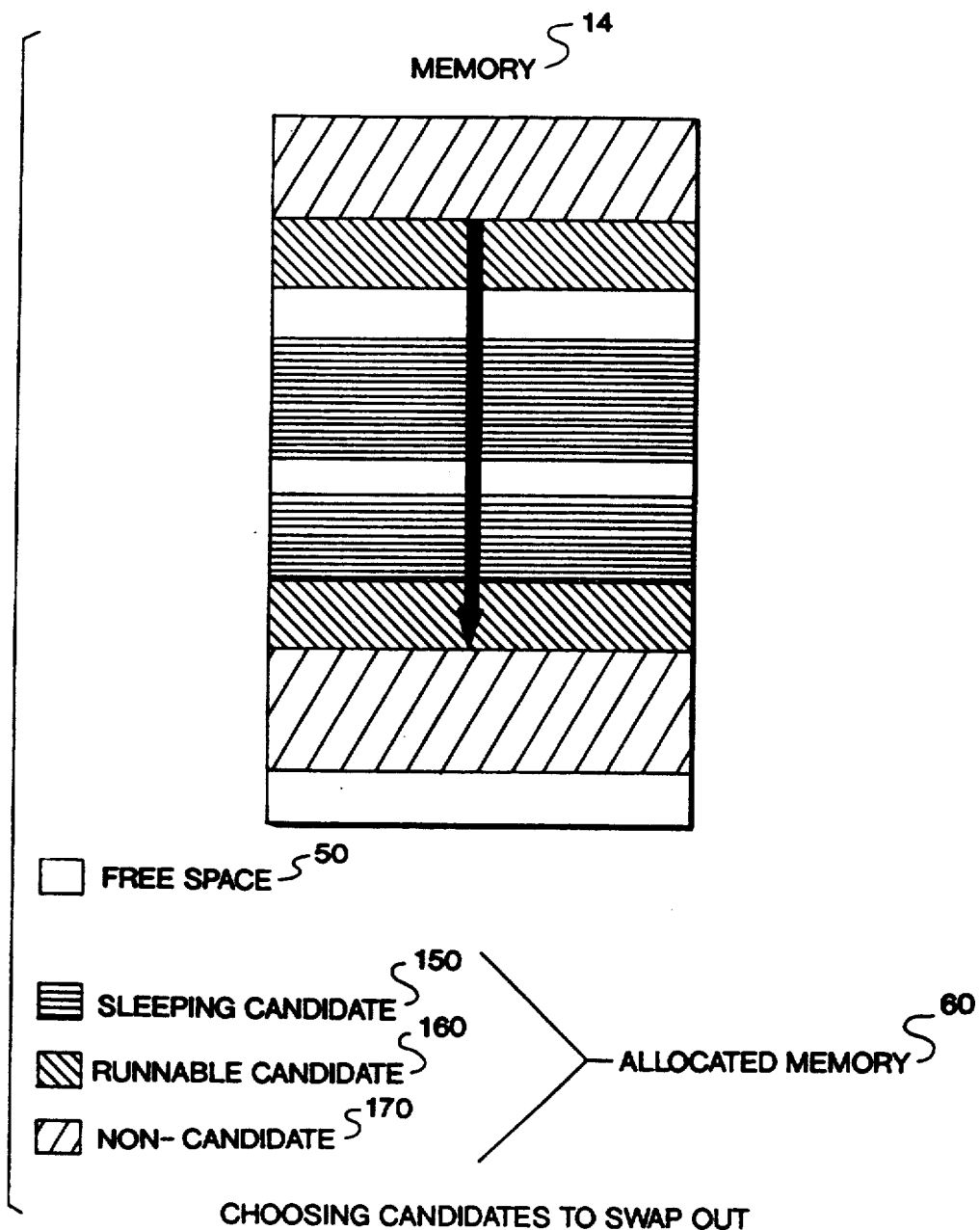
FIG. 10 is a diagram illustrating memory layout as pertains to choosing a swapout candidate.

In the case that there is no free memory space 50 for the current nonsplittable segment, intelligent choices are made about how to create free space 50. The six choices for swapout candidates follow in order of priority. First, segments belonging to shared process images that already have some of their segments moved to the swap device 70 are swapped out. This includes dual image segments and partially swapped images. Second, segments belonging to sleeping processes 150 which with adjacent free space 50 are of sufficient size for the current segment are swapped out. Third, segments belonging to adjacent sleeping processes 150 who together free enough space for the current segment are swapped out. Fourth, segments belonging to both runnable 160 and sleeping 150 processes who together with adjacent free space 50 are of sufficient size for the current segment are swapped out. Fifth, segments belonging to adjacent runnable 160 and sleeping 150 candidates who together free enough space for the current region are swapped out. Finally, as a last resort, shared memory segments are swapped out. FIG. 10 illustrates a main memory layout, including free space 50, swapout candidates 150 and 160, and non-candidates 170 for the swapout procedure previously described. That is, all of the segments under the heavy arrow in the diagram could be swapped out if necessary to free enough main memory 14 space for an incoming segment.

When memory is allocated for a segment by the swapin procedure, the value SG_JUST_IN is set in the s_flags field of the segment table entry 90 FIG. 4 to keep track of which segments need physical copying. That is, segments already containing data do not need to be copied in from the swap device 70; their s_flags field indicates this by containing the value SG_LOAD. This situation occurs when a process is a dual image or is partially swapped out. For example, if only the data segment of a process was swapped out, then only that data segment is copied back to memory 14 from the swap device 70. The count of allocated (in-memory) segments in the shared image process table 190 FIG. 6 entry field si_segs_in is also incremented at this time.

When the count of allocated segments is equal to the total number of segments for this process image, space in memory 14 has been allocated for the entire image so segments on the swap device can be copied into memory 14. The segments are sequentially processed. This processing includes locking the segment table entry to make it inaccessible by other processes, physically copying the data of size s_size contained in the segment from the swap device 70 at the address saved in the segment table 90 entry field s_swapaddr 70 to main memory 14 at the address saved in the segment table 90 entry field s_base, and setting the value SG_LOAD in the s_flags field of the segment table 90 entry (indicating memory 14 now contains the segment data).

If any of the segments just swapped in are shared memory segments (those being shared between more than one process) each shared image process table 190 entry is updated. This includes updating reference counts and marking that process image as loaded if all segments for that process image are now in memory 14.

At the successful completion of memory allocation for the current process, it is able to execute. Sched then continues searching the process table 180 for another eligible process to swapin, continuing the loop described earlier.

SWAPOUT

Out_seg is the procedure called during swapin which creates free space 50 in main memory 14 by moving data in a segment from memory 14 to a swap device 70. The particular segments to be swapped out are determined as previously described.

Initially, the segment table entry of the segment whose contents are to be swapped out is locked to make it inaccessible by other processes.

Figure 11:
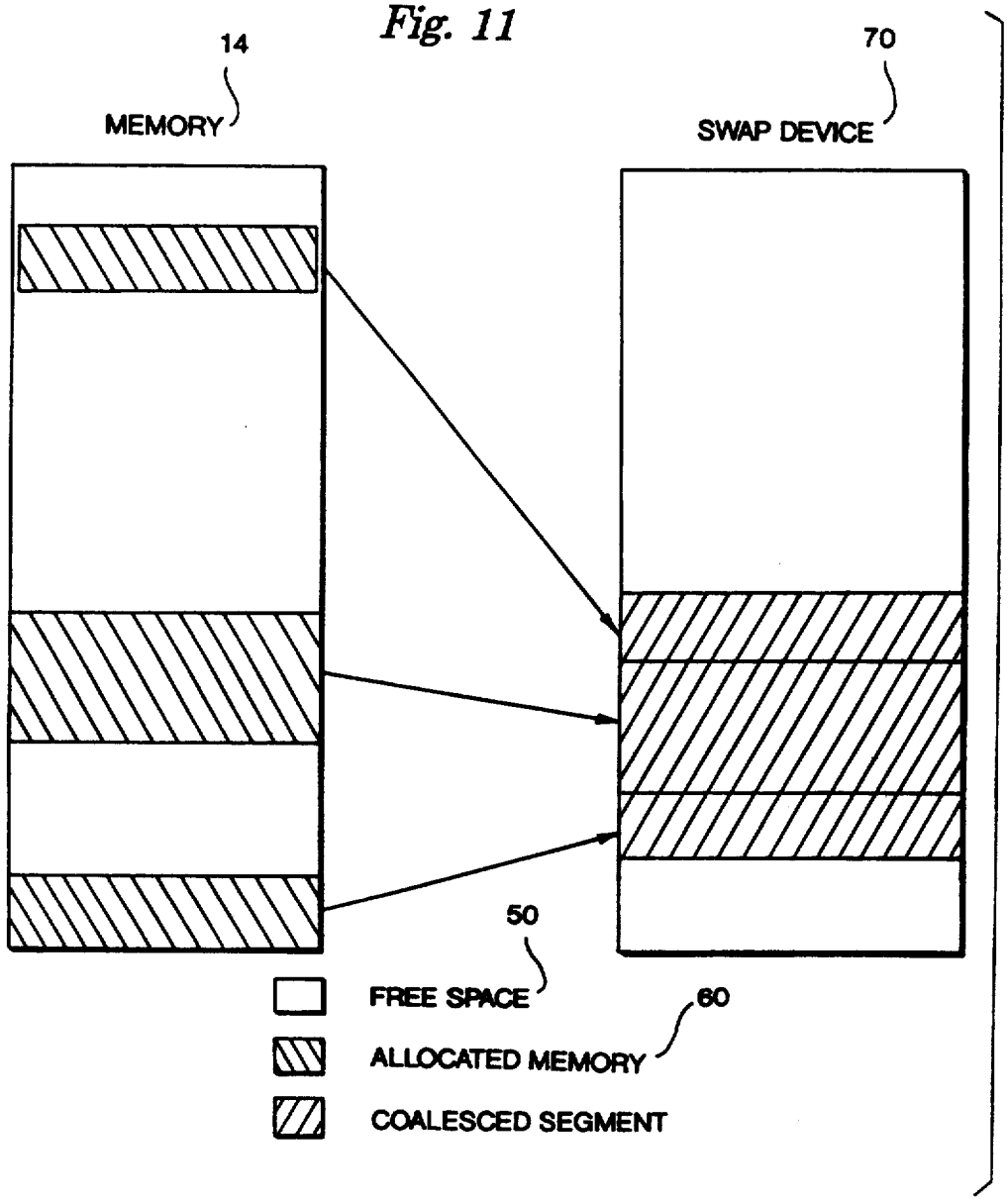
FIG. 11 is a diagram illustrating the coalescing of a segment.

If the entries in the segment table 90 FIG. 4 indicate that this segment has been split into more than one piece (s_flags contains the value SG_SPLIT), then those splits are re-united or coalesced. Coalesing, which implies that contiguous space is allocated on the swap device 70 for all splits and the contents of the splits are merged into this area when written from memory 14, is shown in FIG. 11.

The segment, split or unsplit, of size s_size is physically copied from main memory 14 at the address saved in the segment table 90 entry field s_base to the swap device 70 at the address saved in the segment table 90 entry field s_swapaddr 70. Then, depending on exact circumstances, flags are updated to reflect the swapout status. The shared image process table 190 entry reference count (si_segs_in), that is the count of the number of segments in memory 14, is decremented for each image sharing this segment. The shared image process table 190 entry field si_data_avail is adjusted to reflect the coalesing of the splits. The values SG_SPLIT, SG_JUST_IN, and SG_LOAD are cleared from the segment table entry field s_flags to indicate that it is no longer split, memory is no longer reserved for it, and data for it is no longer contained in main memory 14. The data control register sets 80 describing this segment are also cleared.

Figure 12:
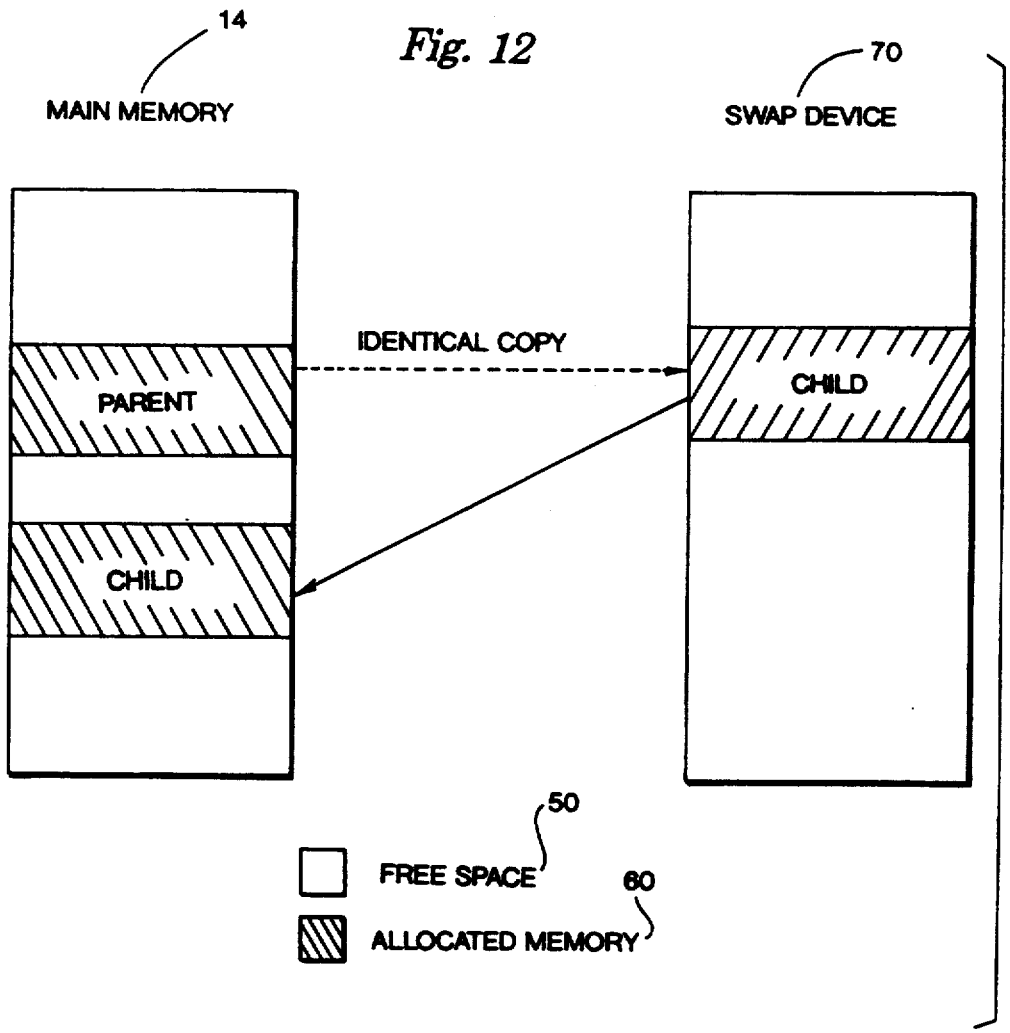
FIG. 12 is a diagram illustrating the standard non-virtual UNIX method of creating a child process via the swapout procedure when enough main memory is not available.

If swapout is being called as the result of a fork (indicating a parent process image is being copied to the swap device 70 without destroying the parent process image to create a new child process image), main memory 14 for this segment is not freed. In all other cases, space in main memory 14 for the swapped out segments of a process is freed. In the case of a fork, the child process image on the swap device 70 will be swapped in later when the child process is eligible to execute. This standard real memory (non-paged) creation method, is illustrated in FIG. 12.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

Appendix A

MEMORY MANAGEMENT PSEUDO-CODE

1.0  sched()

```
/* Procedure:   sched()
 * Purpose:     Swap in all eligible images.
 */ sched()
{
loop:
    for ( each proc table entry )
        choose oldest eligible if ( none eligible )
        sleep unload:
    attempt to swap image in
    if ( cannot swap in ) {
        swap back out                              /* coalesce*/
        attempt to swap in again                   /* now can resplit*/
        if ( successful )
            goto loop                     /* choose next process to swap in*/
```

```
          else
                 if ( process has only been out short while )
                     delay one second
                     goto unload                          /* try to bring in again*/
                 else
                     swap out first candidate on allocated list
                     attempt to swap in again
                     if ( successful )
                         goto loop                        /* choose next process to swap in */
                     delay one second                     /* cannot bring in, delay &*/
                     goto loop                            /* choose next process to swap in*/
    }else
             goto loop                                    /* choose next process to swap in*/

} /* sched */
```

2.0  swapin

```
/* Procedure:   swapin()
 * Purpose:     Swap in all segments of specified shared image.
 */ swapin( si_ptr )
{
    /* allocate memory for all segments of image */
    for ( each segment in image ) {
        if ( already has memory )
            use it
        else {
            find memory for segment                       /* in_seg()*/
            if ( could not find memory )
                retry, forcing out shared texts           /* in_seg()*/
            if ( memory found )
                set SG_JUST_IN in segment flags           /* did not already*/
                                                          /* have memory*/
                for ( all images sharing this segment )
                    adjust count of segments alloc'd      /* si_segs_in*/
        }
    }
    if ( all segments successfully alloc'd memory ) {
        for ( each segment in image ) {
            lock the segment for swapping                 /* swaplock()*/

/* do physio */
            if ( segment is not loaded ){
                swap in valid blocks                      /*invalid blocks if growing*/
                                                          /* or creating segment*/
                set SG_LOAD in segment flags              /* physio is done */
                if ( swap image exists )                  /* won't if creating */
                    free swap space
            }

/* lock not released until next loop, held until */
            /* after reference counts are adjusted*/
        } /* for - adjust reference counts and possibly set SLOAD */
        for ( each segment in image ) {
            if ( SG_JUST_IN ) {
                for ( each sharing image ) {
                    if ( segment counts indicate all segments in )
                        if ( none of segments in are dual images )
                            set SLOAD/* physio need be done for duals */
```

```
                    update swap and memory reference counts
                }
                set off SG_JUST_IN
            }
            release swap lock                                          /* swaprele() */
        } /* for */
    } else
        return failure
} /* swapin */
```

3.0    swapout

```
/* Procedure:   swapout
 * Purpose:     Swap out all segments in specified image.
 */ swapout( si_ptr )
{
    for ( each segment in image ) {
        swap out segment                                               /* out_seg()*/
    }
    if ( swapped out to create child on swap device ){
        put child on runq
        wake parent
    }

} /* swapout */
```

4.0    in_seg

```
/* Procedure:   in_seg
 * Purpose:     Find memory for specified segment. Possible force
 *              out other segments to do so.     */
in_seg( seg_ptr, seg_type, si_ptr )
{
    attempt to malloc
    /* no free entry of sufficient size exists, try splitting if possible  */
    if ( failed and this is a splittable segment )             /* data or shmem */
        if ( shared memory segment )
            find minimum of control registers available to all sharing
        while ( failed and control registers and memory available ) {
            malloc largest available chunk                     /* free->tail*/
            if ( successful ) {
                decrement register counts for all sharing images
                record split in segment table
                set on SG_SPLIT segment flag
                attempt to malloc remainder
            }
        }
    }
    if ( failed ) {
        swap out segments of shared images that have some segments already out
        attempt to malloc incoming segment again
    } if ( failed ) {
        swap out sleeping candidates who with adjacent free space are of
            sufficient size for incoming segment
        attempt to malloc incoming segment again
    }
```

```
    if ( failed ) {
        swap out adjacent sleeping candidates who together free enough
            space for incoming segment
        attempt to malloc incoming segment again
    } if ( failed ) {
        swap out runnable/sleeping candidates who with adjacent free
            space are of sufficient size for incoming segment
        attempt to malloc incoming segment again
    } if ( failed ) {
        swap out adjacent runnable/sleeping candidates who together
            free enough space for incoming segment
        attempt to malloc incoming segment again
    }

} /* in_seg */
```

5.0   out_seg()

```
/* Procedure:   out_seg()
 * Purpose:     Swap out specified segment.
 */ out_seg( segment, si_ptr )
{
    lock for swapping                                               /* swaplock()*/
    if ( swappable SG_SPLIT segment ) {
        if ( segment is SG_LOADED ) {                               /* physio done*/
            /* all splits must be in, coalesce on swap device */
            alloc swap space large enough for all splits
            set off SG_LOAD segment flag
            for ( each image sharing this segment ) {
                adjust reference counts
                set off SLOAD
            }
            for ( each split ) {
                copy to swap device                                 /* do physio*/
                /* fork => child being created on swap device, do not    */
                /* free parent's memory                                  */
                if ( not forking )
                    free memory
                for ( each image sharing this segment )
                    adjust segment counts
            }
            set off SG_SPLIT
        } else {
            /* physio not done => dual segment or all splits not alloc'd */
            for ( each split ) {
                free memory
                for ( each image sharing this segment )
                    adjust segment counts
            }
            set off SG_SPLIT                    /* may not have been on*/
            set off SG_JUST_IN                  /* swapin must realloc*/
        }
    } else if ( swappable SG_LOAD'd segment ) {                     /* not split*/
        set off SG_LOAD
        for ( each image sharing this segment ) {
```

```
                adjust reference counts
                adjust segment counts
                set off SLOAD
        }
        if ( segment is being created )            /* segment's r_nvailid == 0*/
                adjust segment counts              /* need not alloc swap*/
        else {
                if ( swap image exists )
                    use it
                else
                    alloc swap space
                    copy to swap space             /* do physic*/
                /* fork => child being created on swap device, */
                /* do not                                                    */
                /* free parent's memory                                      */
                if ( not forking )
                    free memory
            }
    } else {                    /* not SG_LOAD'd or not swappable (still shared) */
        if ( not SG_LOAD but has memory ) {              /* dual segment*/
            free memory
            for ( each image sharing this segment )
                update segment counts
            set off SG_JUST_IN                           /* swapin must realloc*/
        }
        /* else => still shared, do nothing */
    }
    release swap lock                                    /* swaprele()*/

} /* out_seg */
```

6.0   is_cand()

```
/* Procedure:   is_cand()
 * Purpose:     Determine if specified memory is a sleeping
                swap out candidate.
 */ is_candr( memory node, si_ptr )
{
    if ( segment is SG_LOCK'd )
        return failure if ( segment is process 0's kseg area )
        return failure if ( shared segment and not being forced out )   /* r_refcnt, FORCE_OUT*/
        return failure for ( each image sharing this segment ) {
        if ( ( image is being swapped out ) or
             ( all processes sharing image are not sleeping ) )
                return failure
        if ( ( any process sharing image is a system process ) or
             ( image is locked in memory ) )
                return failure
    }
} /* is_cand */
```

7.0 is_candr()

```
/* Procedure:  is_candr()
 * Purpose:    Determine if specified memory is a
 *             runnable/sleeping swap out candidate.
 */ is_candr( memory node, si_ptr )
{ if ( segment is SG_LOCK'd )
        return failure if ( segment is process 0's kseg area )
        return failure if ( shared segment and not being forced out )    /* r_refcnt, FORCE_OUT*/
        return failure for ( each image sharing this segment ) {
        if ( ( image is being swapped out ) or ( image has
                microtasks ) or
                ( any process sharing is currently running ) )
            return failure
        if ( any process sharing image is a system process, is
                locked in memory, or is runnable but has not been out
                long enough )
            return failure
    }
} /* is_candr */
```

We claim:

1. An improved method for operating a non-virtual main memory manager using swapin and swapout operations to allocate and un-allocate space in a non-virtual main memory for one or more segments of one or more process images residing on a swap device and ready to be executed in a computer processing system that includes one or more processors sharing the main memory and the swap device wherein the segments require space of varying sizes and all of the segments for a process image must be resident in the main memory before the process image can be executed by the computer processing system: and wherein the main memory manager performs a swapin operation for the segments of a selected process image ready to execute when space in the main memory is available and performs a swapout operation for the segments of one or more process images that are currently stored in the main memory, the steps of the improved method comprising:

constructing at least a segment location list identifying all physical segment spaces in the main memory, a segment active list identifying space in the main memory currently allocated to one or more segments, and a segment available list identifying space in the main memory currently un-allocated to any segments, checking the segment available list for sufficient contiguous space in the main memory which has not been allocated to any segment and which is large enough to contain one or more segments of a process image which are ready to be swapped into the main memory, performing a swapin allocation operation to allocate the contiguous space in the main memory to the one or more segments in the event that sufficient un-allocated contiguous space in the main memory is available to store one or more of the segments of the process image ready to be swapped into the main memory, updating at least the segment available list and the segment active list after performing the swapin allocation operation, checking the segment active list for a segment candidate to swap out from the main memory in the event that insufficient un-allocated contiguous space in the main memory is available to store any one or more segments of the process image ready to be swapped into the main memory, performing a swapout operation on the segment candidate to un-allocate the space in the main memory which was allocated to the segment candidate, and updating at least the segment available list and the segment active list after performing the swapout operation on the segment candidate.

2. The improved method of claim 1 wherein the segment location list is ordered by physical location of all segments in the main memory both allocated and un-allocated.

3. The improved method of claim 1 wherein the segment active list is ordered by the size of the contiguous space in the main memory required for each segment.

4. The improved method of claim 1 wherein the segment available list is ordered by the size of the contiguous space in main memory which is not allocated to any segment.

5. The improved method of claim 1 wherein the segment location list, the segment available list, and the segment active list are circular doubly linked lists.

6. The improved method of claim 1 further comprising the steps of:

repeating in sequence any of the steps of checking the segment available list, performing a swapin allocation operation, updating at least the segment available list and the segment active list after performing the swapin operation, checking the segment active list, performing a swapout operation on the segment candidate and updating at least the segment available list and the segment active list until each segment of the process image ready to be swapped into the main memory has been allocated space in the main memory, transfering all of the segments from the swap device to the main memory, and updating the segment location list, the segment available list and the segment active list to reflect the current location of segments in the main memory and the current locations of segments in the main memory which have been allocated and which have not been allocated.

7. An improved dual image allocation method for operating non-virtual main memory manager using swapin and swapout operations to allocate and un-allocate space in a non-virtual main memory for one or more segments of one or more process images residing on a swap device and ready to be executed in a computer processing system that includes one or more processors sharing the main memory and the swap device wherein the segments require space of varying sizes and all of the segments for a process image must be resident in the main memory before the process image can be executed by the computer processing system, the steps of the improved method comprising:

performing a swapin allocation operation to allocate contiguous space in the main memory to at least one segment of one process image residing on the swap device, the swapin allocation operation including the step of checking to determine if the one segment already has been allocated space in the main memory, if so, performing another swapin allocation operation to allocate contiguous space in the main memory to another segment of the one process image, if not, checking for an un-allocated contiguous space in the main memory large enough to store the entire one segment, and allocating that space to the one segment and copying the segment to the main memory, in the event that space is allocated to the one segment, retaining an image of the segment on the swap device so as to create a dual image allocation whereby it is only necessary to un-allocate the space allocated to the one segment, without copying the segment to the swap device in the event the segment is to be removed from main memory by a swapout operation.

8. The improved method of claim 7 further comprising the step of:

retaining allocated space in the main memory for some segments of a process image until all segments of that process image have been allocated space in the main memory.

9. The improved method of claim 8 further comprising the step of:

freeing a process image from the swap device in the event that all segments of that process image have been allocated space in the main memory.

10. An improved partial image swapout method for operating a non-virtual main memory manager using swapin and swapout operations to allocate and un-allocate space in non-virtual main memory for one or more segments of one or more process images residing on a swap device and ready to be executed in a computer processing system that includes one or more processors sharing the main memory and the swap device wherein the segments require space of varying sizes and all of the segments for a process image must be resident in the main memory before the process image can be executed by the computer processing system, the steps of the improved method comprising:

as one step in the swapout operation, performing a partial swapout operation by swapping out of the main memory less than all of the segments of one process image contained in the main memory in order to free allocated space in the main memory to enable the swapin operation to allocate the now un-allocated space in the main memory to one or more segments of another process image.

11. The improved method of claim 10 wherein the step of performing the partial swapout operation enables one or more of the segments that were swapped out to obtain additional space in the main memory in the event that the segment is swapped in again with out swapping out all of the segments of the process image at the time that the one or more segments are swapped out.

12. An improved split image swapin method for operating a non-virtual main memory manager using swapin and swapout operations to allocate and un-allocate space in non-virtual main memory for one or more segments of one or more process images residing on a swap device and ready to be executed in a computer processing system that includes one or more processors sharing the main memory and the swap device wherein the segments require space of varying sizes and all of the segments for a process image must be resident in the main memory before the process image can be executed by the computer processing system, the steps of the improved method comprising:

determining whether there is un-allocated space in the main memory of sufficient size to contain a segment to be swapped into the main memory, if there is un-allocated space in the main memory of sufficient size to contain the segment to be swapped into the main memory, then allocating that space to the segment, if there is not sufficient un-allocated space in the main memory to contain the segment to be swapped into the main memory, then determining whether the segment may be divided into split segments according to a pre-determined criteria and if the segment may be divided into split segments, then splitting the segment into at least two split segments, at least one of the split segments being allocated a memory size corresponding to an un-allocated contiguous space in the main memory.

13. The improved method of claim 12 further comprising the step of:
  recording for the segment which has been split into split segments a lower bound, an upper bound and a displacement to enable mapping of a logical storage address to its physical location in the main memory.

14. The improved method of claim 13 wherein the lower bound, the upper bound and the displacement are recorded in a set of registers in the multiprocessor system.

15. The improved method of claim 14 wherein the multiprocessor system has a predetermined number of sets of registers to enable a predetermined number of segments to be split into split segments and thereby provide mapping of a logical storage address to its physical location in the main memory for each split segment.

16. The improved method of claim 15 wherein in the event that a split segment is swapped out of the main memory, the set of registers containing the lower bound, the upper bound, and the displacement is cleared and thereby becomes available for recording the lower bound, the upper bound and the displacement of another segment which is split into split segments.

17. The improved method of claim 16 further comprising the step of:
  coalescing the split segments of the one segment into contiguous space on the swap device.

18. An improved swapout selection method for operating a non-virtual main memory manager using swapin and swapout operations to allocate and un-allocate space in a non-virtual main memory for one or more segments of one or more process images residing on a swap device and ready to be executed in a computer processing system that includes one or more processors sharing the main memory and the swap device wherein the segments require space of varying sizes and all of the segments for a process image must be resident in the main memory before the process image can be executed by the computer processing system, the steps of the improved method comprising:
  creating un-allocated space in the main memory by performing a swapout operation on a segment chosen by analyzing the segments stored in the main memory which are adjacent to any contiguous space in the main memory that can be allocated to a segment to be swapped into the main memory, such that a segment will not be swapped out of the main memory unless doing so creates sufficient contiguous space in the main memory to allocate for the memory size of the segment to be swapped into the main memory, thereby increasing the efficiency of the main memory manager.

19. The improved method of claim 18 wherein the segment selected as the focus of the swapout operation to increase the efficiency of the main memory manager is a segment having both allocated space in the main memory and an image of the process associated with the segment on the swap device.

20. The improved method of claim 18 wherein the segment selected as the focus of the swapout operation to increase the efficiency of the main memory manager is a segment associated with a process image which currently cannot be executed and which has allocated space in the main memory that is adjacent to un-allocated space in the main memory of sufficient size that when the adjacent un-allocated space in the main memory is combined with the memory size of the space allocated to the segment to be swapped out the resulting memory size is large enough to contain another segment to be swapped into the combined space in the main memory.

21. The improved method of claim 18 wherein the segment selected as the focus of the swapout operation to increase the efficiency of the main memory manager is a segment associated with a process image which currently cannot be executed and is adjacent to a second segment associated with another process image which currently cannot be executed such that when the space in the main memory for the one segment is combined with the space in main memory for the second segment, the resulting memory size is large enough to contain a current segment to be swapped into the combined space in main memory.

22. The improved method of claim 18 wherein the segment selected as the focus of the swapout operation to increase the efficiency of the main memory manager is a segment associated with either a process image which is currently executable or a process image which is not currently executable and is adjacent to un-allocated space in the main memory of sufficient size that when the memory size of the space allocated to the segment which is the focus of the swapout operation and the adjacent un-allocated space in the main memory are combined, the resulting memory size is large enough to contain another segment to be swapped into the combined space in the main memory.

23. The improved method of claim 18 wherein the segment selected as the focus of the swapout operation to increase the efficiency of the main memory manager is a segment associated with a process image which currently cannot be executed and is adjacent to a second segment associated with a process image which currently can be executed such that when the space in the main memory for the one segment is combined with the space in main memory for the second segment, the resulting memory size is large enough to contain a current segment to be swapped into the combined space in main memory.

24. An improved method for operating a non-virtual main memory manager using swapin and swapout operations to allocate and un-allocate space in non-virtual main memory for one or more segments of one or more process images residing on a swap device in a computer processing system that includes one or more processors sharing the main memory and the swap device wherein the segments require space of varying sizes and all of the segments for a process image must be resident in the main memory before the process image can be executed by the computer processing system, and wherein the main memory manager performs a swapin operation for the segments of a selected swapin process image ready to execute and performs a swapout operation for the segments of one or more process images currently stored in the main memory, the steps of the improved method comprising:
  determining for each segment of the selected swapin process image if space in main memory has or has not been allocated for that segment,
  in the event that space in the main memory has not been allocated for a segment, then determining if sufficient contiguous space in the main memory can or cannot be allocated for that segment,
  in the event that sufficient contiguous space in the main memory cannot be allocated for that segment, then attempting to allocate space in the main memory for that segment by allowing segments shared by more than one process image to be forced out of the main memory.

25. The improved method of claim 24 wherein the step of attempting to allocate space in the main memory comprises:
performing a search of space in main memory to determine if sufficient contiguous un-allocated space in the main memory exists which is of sufficient size to contain that segment.

26. The improved method of claim 24 wherein the step of allocating space in the main memory comprises:
splitting that segment into split segments, each split segment of a memory size which fits within the currently un-allocated spaces in the main memory.

27. The improved method of claim 24 wherein the step of allocating space in the main memory comprises:
performing a swapout operation on segments in the main memory which are associated with other process images which do not have all segments associated with the process image contained in the main memory.

28. The improved method of claim 24 wherein the step of allocating space in the main memory comprises:
performing a swapout operation on segments in the main memory associated with a process image which is not currently executable and which are adjacent to un-allocated space in the main memory such that the memory size of the segments combined with the memory size of the adjacent un-allocated space in the main memory is sufficient contiguous space in the main memory to contain that segment which is to be swapped into main memory.

29. The improved method of claim 24, wherein the step of allocating space in the main memory comprises:
performing a swapout operation on segments in the main memory associated with a process image which is not currently executable or associated with a process image which is currently executable and which are adjacent to un-allocated space in the main memory such that the memory size of the segments combined with the memory size of the adjacent un-allocated space in the main memory is sufficient contiguous space in the main memory to contain that segment which is to be swapped into main memory.

30. The improved method of claim 24 wherein the step of allocating space in the main memory comprises:
performing a swapout operation on adjacent segments in the main memory associated with other process image which is not currently executable and associated with process image which is currently executable and, such adjacent segments are adjacent to un-allocated space in the main memory such that the memory size of each segment combined with the memory size of the adjacent un-allocated space in the main memory is sufficient contiguous space in the main memory to contain that segment which is to be swapped into main memory.

31. The improved method of claim 24 wherein the step of allocating space in the main memory comprises:
first searching space in the main memory to determine if any un-allocated space in the main memory exists which is large enough to contain that segment, and in the event that sufficient space in the main memory to contain that segment is not un-allocated, then,
secondly attempting to split that segment into split segments which fit within currently un-allocated spaces in the main memory and if the split segments of that segment do not fit within currently un-allocated spaces in the main memory, then
thirdly performing a swapout operation on segments of other process images which have some segments already swapped out and if that segment did not fit within then un-allocated spaces in the main memory, then
fourthly performing a swapout operation on segments of a process image which is not currently executable which combined with adjacent un-allocated space in the main memory creates contiguous memory of a size to contain that segment and if that segment did not fit within then un-allocated spaces in the main memory, then
fifthly performing a swapout operation on segments of a process image which are not currently executable or a process image which is currently executable, these segments combined with un-allocated space in the main memory adjacent to those segments creates contiguous memory of a size to contain that segment which is to be swapped into main memory.

32. An improved swapout coalescing method for operating a non-virtual main memory manager using swapin and swapout operations to allocate and un-allocate space in non-virtual main memory for one or more segments of one or more process images residing on a swap device and ready to be executed in a computer processing system that includes one or more processors sharing the main memory and the swap device and wherein the segments require space of varying sizes and all of the segments for a process image must be resident in the main memory before the process image can be executed by the computer processing system, and wherein the main memory manager performs a swapin operation for the segments of a selected process image ready to execute and performs a swapout operation for the segments of one or more process images currently stored in the main memory, the steps of the improved method comprising:
allocating a space on the swap device of a size which is large enough to contain a segment of a selected swapout segment of a process image,
determining if the selected swapout segment has been divided into two or more split segments,
in the event that the selected swapout segment has split segments, coalescing the split segments into the space allocated on the swap device, and
in the event that the segment has no split segments, moving the segment into the allocated space on the swap device.

33. An improved dual allocation swapout method for operating a non-virtual main memory manager using swapin and swapout operations to allocate and un-allocate space in non-virtual main memory for one or more segments of one or more process images residing on a swap device and ready to be executed in a computer processing system that includes one or more processors sharing the main memory and the swap device and wherein the segments require space of varying sizes and all of the segments for a process image must be resident in the main memory before the process image can be executed by the computer processing system, and wherein the main memory manager performs a swapin operation for the segments of a selected process image ready to execute and performs a swapout operation for the segments of one or more process images currently stored in the main memory, the steps of the improved method comprising:

determining if a segment to be swapped out of the main memory has a dual allocation in the main memory and on the swap device, in the event that the segment has a dual allocation in the main memory and on the swap device, un-allocating space in the main memory allocated for that dual allocation of the segment without copying the segment to the swap device as part of a swapout operation.

34. The improved method of claim 33 further comprising the steps of:

determining that the segment to be swapped out does not have a dual allocation in the main memory and on the swap device, allocating a space on the swap device of a sufficient size to contain the segment, determining that the segment has been divided into split segments, in the event that the segment has been divided into partial segments, coalescing the split segments into the space allocated on the swap device, and in the event that the segment has no split segments, moving the segment into the space on the swap device.

35. In a computer processing system, an efficient method for managing memory allocation of a non-virtual main memory to a plurality of processes to be executed by one or more processors in the computer processing system, each process having a process image including one or more segments that are stored in the main memory or in a swap device, each segment having a defined memory size and containing a type of information associated with that process, wherein the memory size of different segments is variable and all of the segments of a process must be resident in the non-virtual main memory in order for that process to be executed by the computer processing system, the method comprising the processor-implemented steps of:

(a) selecting a swapin process to be swapped into the main memory from the swap device;

(b) for each segment of the process image of the swapin process, performing the steps of:

(b1) determining whether the segment has been allocated space in the main memory;

(b2) if the segment has not been allocated space in the main memory, determining whether there are any un-allocated contiguous spaces in the main memory;

(b3) if there are no un-allocated contiguous spaces in the main memory, executing a swapout procedure to create one or more un-allocated contiguous spaces in the main memory; and (b4) if there is at least one un-allocated contiguous space in the main memory, attempting to allocate contiguous space in the main memory for the segment, including the steps of:

(b41) allocating space to the segment if there is sufficient un-allocated contiguous space in the main memory for the memory size of the segment, (b42) splitting the segment into two or more split segments if there is not sufficient contiguous space in the main memory to allocate for the memory size of the segment and if the segment contains one of a predetermined set of types of information which can be split, such that at least one of the split segments is of a memory size that sufficient un-allocated contiguous space in the main memory can be allocated to that split segment, and (b43) executing the swapout procedure if there is not sufficient un-allocated contiguous space in the main memory for the memory size of the segment or one of the split segments and repeating steps (b41)–(b42); and (c) if all of the segments of the swapin process were allocated space in the main memory, copying all of the segments of the process image from the swap device to the main memory and adding the process to a run queue of processes to be executed by one or more of the processors.

36. The method of claim 35 further comprising in the event that all of the segments for the swapin process were not allocated space in the main memory as a result of step (b), performing the steps of:

(b5) swapping out all of the sements of the swapin process that were allocated space in the main memory to allow any split segments to be coalesced and repeating steps (b2)–(b4);

(b6) in the event that all of the segments for the swapin process were not allocated space in the main memory as a result of step (b5), delaying for a predetermined period of time and repeating step (b5); and (b7) in the event that all of the segments for the swapin process were not allocated space in the main memory as a result of step (b6), selecting a new swapin process and repeating step (b).

37. The method of claim 35 wherein the swapout operation selects the segments to be swapped out of the main memory by analyzing the segments stored in the main memory which are adjacent to any contiguous spaces in the main memory that can be allocated to the segment of the swapin process, such that a segment will not be swapped out of the main memory unless doing so creates sufficient contiguous un-allocated space in the main memory to allocate for the memory size at least one of the segments or split segments of the swapin process.

38. The method of claim 37 wherein the swapout operation comprises the steps of:

(a) unallocating space for any segments of any process images for which not all of the segments of the process image have been allocated space in the main memory;

(b) determining if swapping out a process that is sleeping and is adjacent to any unallocated space will create sufficient space to allocate to one or more of the segments or split segments of the swapin process and, if so, swapping out that process and exiting the swapout operation;

(c) determining is swapping out adjacent processes that are sleeping and are adjacent to any unallocated space will create sufficient space to allocate to one or more of the segments or split segments of the swapin process and, if so, swapping out those processes and exiting the swapout operation; and (d) determining if there is a combination of processes that are sleeping and executing and are adjacent to any unallocated space that will create sufficient space to allocate to one or more of the segments or split segments of the swapin process and, if so, swapping out that process and exiting the swapout operation.

39. In a computer processing system, a split segment method for managing memory allocation of a non-virtual main memory to a plurality of processes to be executed by one or more processors in the computer processing system, each process including one or more segments that are stored in the main memory or in a swap device, each segment having a defined memory size and containing a type of information associated with that process, wherein the memory size of different segments is variable and all of the segments of a process must be resident in the non-virtual main memory in order for that process to be executed by the computer processing system, the method comprising the processor-implemented steps of:

during a swapin allocation operation wherein contiguous space in the main memory is allocated to one or more of the segments of a process that are to be swapped into the main memory from the swap device,
attempting to split one or more of the segments of the process into two or more split segments if there is not sufficient contiguous space in the main memory to allocate for the memory size of the segment and if the segment contains one of a predetermined set of types of information which can be split, such that at least one of the split segments will be of a memory size that sufficient contiguous space in the main memory can be allocated to that split segment; and during a swapout operation wherein one or more of the segments of a process are to be swapped out of the main memory to the swap device, coalescing any split segments of a segment of the process into the memory size of that segment as the segments are transferred to the swap device,
whereby utilization of the main memory is enhanced by splitting the split segments into memory sizes that correspond to contiguous memory spaces in the main memory that are available each time a swapin allocation operation is performed for a process.

40. In a computer processing system, an adjacent swapout method for managing memory allocation of a non-virtual main memory to a plurality of processes to be executed by one or more processors in the computer processing system, each process including one or more segments that are stored in the main memory, in a swap device, or in both the main memory and the swap device, each segment having a defined memory size and containing a type of information associated with that process, wherein the memory size of different segments is variable and all of the segments of a process must be resident in the non-virtual main memory in order for that process to be executed by the computer processing system, the method comprising the processor-implemented steps of:

during a swapout operation wherein one or more of the segments of one or more of the processes are to be swapped out of the main memory to the swap device, selecting the segments to be swapped out of the main memory by analyzing the segments stored in the main memory which are adjacent to any contiguous space in the main memory that can be allocated to the segment to be swapped into the main memory, such that a segment will not be swapped out of the main memory unless doing so creates sufficient contiguous space in the main memory to allocate for the memory size of the segment to be swapped into the main memory.

* * * * *